May 13, 1930.  H. E. BIRKHOLZ  1,758,881
FILTRATION MEDIUM
Filed Oct. 12, 1927

Inventor.
Hans E. Birkholz.
By Rummler & Rummler
Attys.

Patented May 13, 1930

1,758,881

UNITED STATES PATENT OFFICE

HANS E. BIRKHOLZ, OF CHICAGO, ILLINOIS, ASSIGNOR, BY MESNE ASSIGNMENTS, TO AMERICAN AIR FILTER COMPANY, INC., OF LOUISVILLE, KENTUCKY, A CORPORATION OF DELAWARE

FILTRATION MEDIUM

Application filed October 12, 1927. Serial No. 225,660.

This invention relates to filter materials for use in viscous or semi-dry types of air or gas filters.

The main objects of this invention are to provide an improved form of filter material which will have an increased capacity for retaining viscous material; to provide a filter material that will have an increased efficiency in scouring effect on the air or gas passing therethrough; to provide a filter material which will have a longer period of use before cleaning is required than has heretofore been obtained; to provide a filter material in which the individual strands are so twisted and disposed as to present a multiplicity of surfaces disposed in a wide variety of relative angular positions to the air or gas being filtered; to provide a filter material in which the individual strands are so arranged that no flat surfaces are presented at right angles to the streams of air; to provide a filter material which can be economically manufactured in woven strips of indeterminate length and which can be as readily packed in a unit cell type filter as it can be wound around the rotary type of continuous air filter shown in my co-pending application, Serial No. 137,536, filed September 24, 1926; to provide a filter material which, when arranged in a mass having a plurality of layers disposed one upon another, will present a uniform spongy filtering mass devoid of open straight passageways from one side to the other; to provide a filter material in which, when arranged in a plurality of layers disposed one upon another, the filtering efficiency can be regulated by compressing the spongy metallic mass; and to provide a filter material from which the dirt and dust can be readily dislodged and washed out.

An illustrative embodiment of this invention is shown in the accompanying drawings in which.

Figure 1:
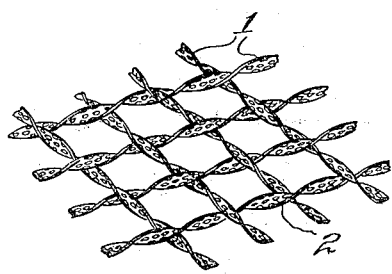
Fig. 1 is a greatly enlarged view in perspective of a fragment of a single layer of the improved material.
Figure 2:
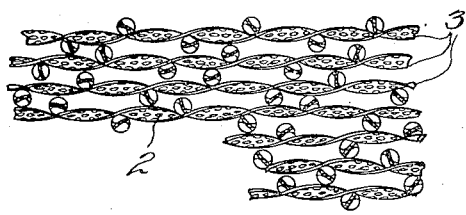
Fig. 2 is a greatly enlarged fragmentary section showing a plurality of layers of the improved material disposed one upon another to form a spongy metallic mass.

Heretofore in the use of filter material of flat ribbon-like metallic strands, it has been knitted in stocking or hose-like tubes of indeterminate length and has been used with considerable success. The inherent nature of the flat ribbon-like strands, however, precluded the smooth surface of the strands from retaining a considerable amount of viscous fluid and such filter material had to depend upon the pockets formed where the strands cross and contact with each other for oil containing capacity. Likewise, in the metallic knitted fabric the majority of the strands stand in soldier-row like position, a feature not particularly nor unusually conducive to effecting the sharp deflections or impingements of the air streams so essential for high efficiency in a viscous type filter medium.

In the present invention the individual strands have had minute pits pressed therein, so as to bulge out on the opposite side, thus increasing the surface area of the strands and at the same time providing oil retaining pockets or wells. Furthermore, the pitted construction produces a rough scouring surface to the streams of air thus securing a highly efficient cleaning effect upon the air or gas coming in contact therewith.

In the construction shown in the drawings, each strand 1 is twisted by rotation of one of its ends about its own longitudinal axis and woven into a fabric of indeterminate width and length. The helical twisting of the strands of both the warp and the woof tends to hold the strands in uniform spaced relationship, due to the interlocking nature of the strands when closely woven. Furthermore, this twisting imparts a sharply spiral motion to the air streamlets which is the desirable ideal effect when depending upon the impingement principle for cleaning air.

The individual strands 1 of this flat ribbon-like material are preferably formed of copper or other suitable metallic material and have a plurality of minute pits or depressions 2 pressed therein so as to bulge out on the opposite side thereof, thus increasing the surface area of the strand as well as providing oil retaining pockets for the viscous fluid.

Figure 3:
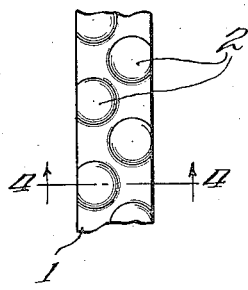
Fig. 3 is a highly magnified plan view of a fragmentary section of an individual strand.
Figure 5:
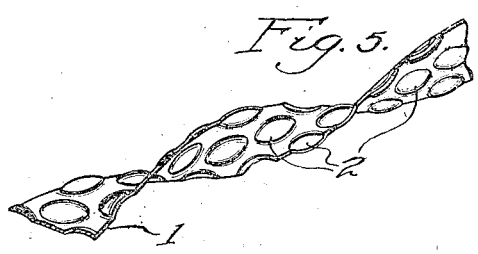
Fig. 5 is a highly magnified view in perspective of a section of an individual strand showing it twisted about its axis and pitted.
Figure 4:
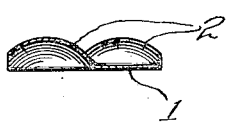
Fig. 4 is an enlarged section taken on the line 4—4 of Fig. 3.

In order to place the maximum number of pits on the surface of the ribbon, they are preferably positioned in staggered relationship to each other, as shown most clearly in Fig. 3, thus leaving a minimum of flat undisturbed surface of the ribbon.

In the use of this filter material a plurality of layers 3, are disposed one upon another, so as to provide a spongy metallic mass which can be compressed in order to regulate the filtering efficiency thereof.

Due to the helical twisting of the pitted metallic ribbons forming the filter mass, there is no flat surface to any appreciable extent presented at right angles to the path of the air at any time.

The tiny rounded bulges and corresponding cup-like depressions invite minute turbulent eddy currents to form when the air streams pass over them, thereby causing the lodgement of dust particles to a more remarkable and unexpected extent than has been heretofore possible with smooth flat ribbon-like strands.

Figure 6:
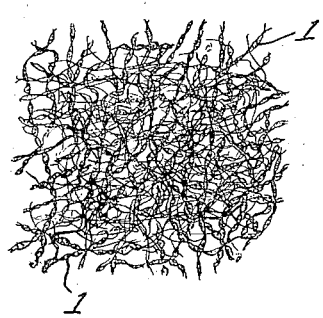
Fig. 6 is an enlarged view showing the improved ribbon material arranged in a tufted mass without being woven.

It is not to be understood that in using this pitted ribbon-like material it must necessarily be either twisted or woven or knitted into layers but can be bunched up into a spongy metallic mass 4, as shown in Fig. 6 of the drawings, and used with equally good results. The weaving into layers has its greatest utility in the ease with which it is wound around the filter drum of a filter, such as is shown in my above-mentioned pending application for patent.

The twisting of the wires does, however, increase the efficiency of the filter mass as a whole as it gives the mass a greater springy sponginess; therefore it can be compressed to different degrees of denseness with greater ease.

The metallic ribbon shown herein is .035 inches wide and .005 inches thick, but it is to be understood that various other sizes can be used with equal efficiency and numerous details of the construction shown may be altered or omitted without departing from the spirit of this invention as defined in the following claim.

I claim:

A filter material comprising a plurality of interengaged twisted ribbon-like metallic strands some of which are permanently deformed to provide a plurality of dish-shaped depressions in one face of the strand and corresponding protuberances in the other face thereof, said deformed portions of the strand being separated by normally undeformed portions.

Signed at Chicago this 10th day of October, 1927.

HANS E. BIRKHOLZ.